(12) United States Patent
Adkisson et al.

(10) Patent No.: US 6,176,511 B1
(45) Date of Patent: Jan. 23, 2001

(54) AIR BAG MODULE

(75) Inventors: Rick A. Adkisson, Gilbert, AZ (US); George C. Crow, Bellaire; Dennis F. Farquhar, Macomb, both of MI (US)

(73) Assignees: TRW Inc.; TRW Vehicle Safety Systems Inc., both of Lyndhurst, OH (US)

( * ) Notice: Under 35 U.S.C. 154(b), the term of this patent shall be extended for 0 days.

(21) Appl. No.: 09/167,282

(22) Filed: Oct. 7, 1998

(51) Int. Cl.[7] ................................................. B60R 21/16
(52) U.S. Cl. ....................... 280/728.2; 280/732; 280/736
(58) Field of Search ............................... 280/728.2, 731, 280/740, 728.1, 732

(56) References Cited

U.S. PATENT DOCUMENTS

| | | | |
|---|---|---|---|
| 4,153,273 | * 5/1979 | Risko | 280/740 |
| 5,230,530 | 7/1993 | Iriyama et al. . | |
| 5,234,229 | 8/1993 | Gordon . | |
| 5,259,642 | 11/1993 | Muller et al. . | |
| 5,419,583 | * 5/1995 | Sakakida et al. | 280/728.2 |
| 5,639,112 | * 6/1997 | Phillion et al. | 280/731 X |
| 5,799,970 | * 9/1998 | Enders | 280/728.2 X |
| 5,813,692 | * 9/1998 | Faigle et al. | 280/728.2 |
| 5,826,901 | * 10/1998 | Adomeit | 280/728.2 |
| 6,029,992 | * 2/2000 | Vendely et al. | 280/731 |

FOREIGN PATENT DOCUMENTS

| | | | |
|---|---|---|---|
| 1367954 | * 10/1971 | (GB) . | |
| 2270883 | * 9/1992 | (GB) . | |

* cited by examiner

Primary Examiner—Lanna Mai
Assistant Examiner—Toan C To
(74) Attorney, Agent, or Firm—Tarolli, Sundheim, Covell, Tummino &Szabo L.L.P.

(57) ABSTRACT

An apparatus (10) for helping to protect an occupant of a vehicle, includes an inflatable protection device (16) and an inflator (14) for, upon actuation, providing inflation fluid to inflate the inflatable device. The apparatus (10) further comprises means (42, 44) for supporting the inflator (14) on a vehicle portion (12) for movement in a first direction (I) relative to the vehicle portion in response to actuation of the inflator. Damping means (50) is connected between the inflator (14) and the vehicle portion (12) for damping movement of the inflator in the first direction (I) relative to the vehicle portion. The damping means (50) comprises a member (52) having an opening (68, 78, 88, 98). The member (52) is crushable in response to movement of the inflator (14) in the first direction (I) to close the opening (68, 78, 88, 98) in the member.

5 Claims, 3 Drawing Sheets

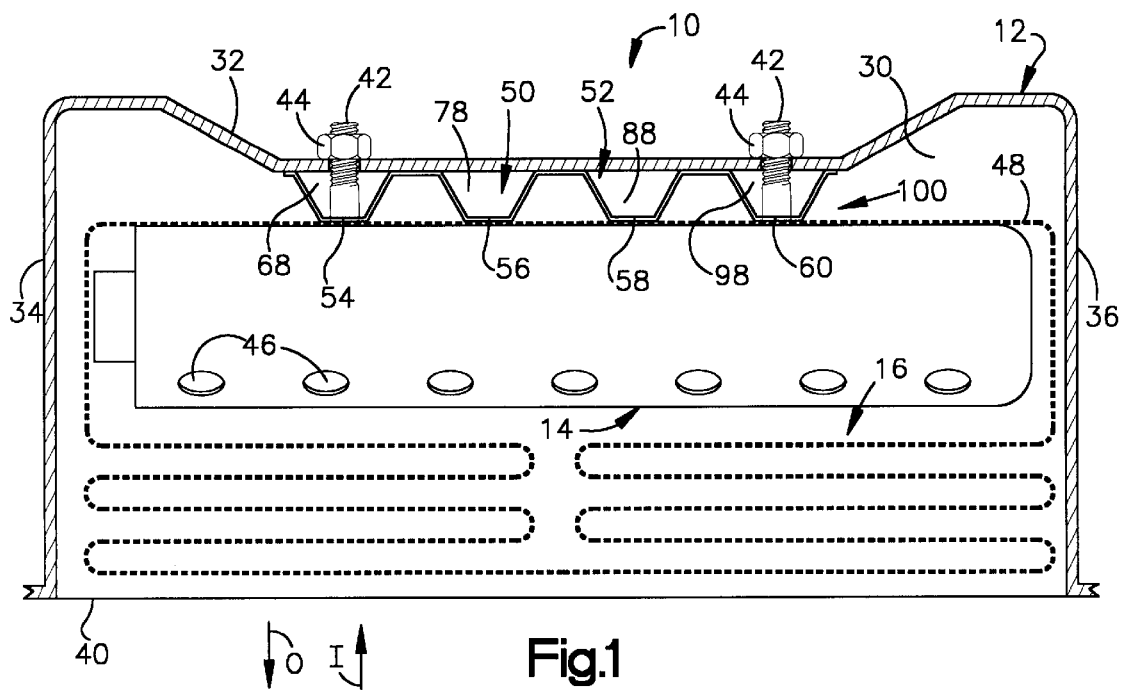

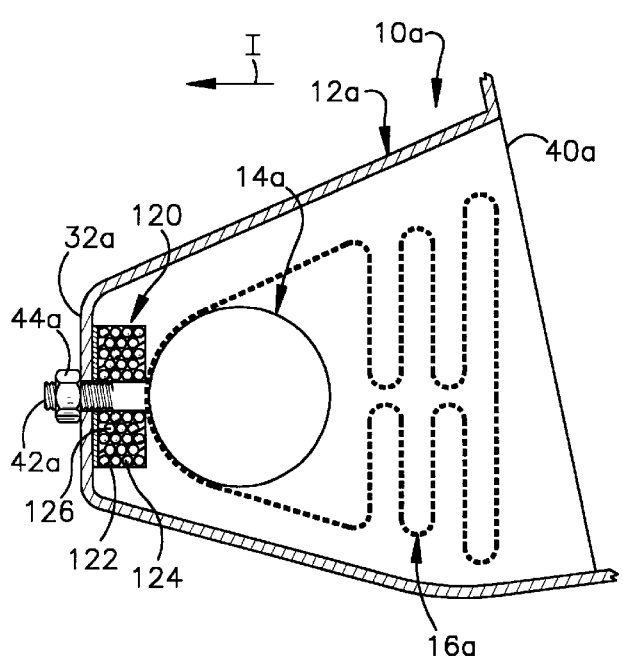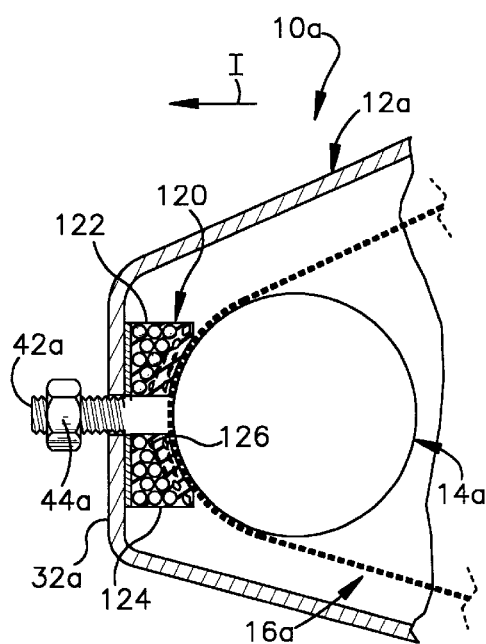
Fig.4    Fig.5
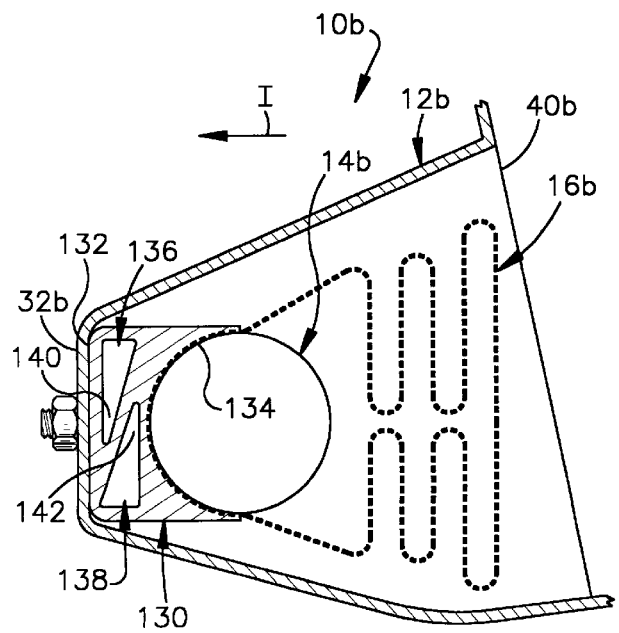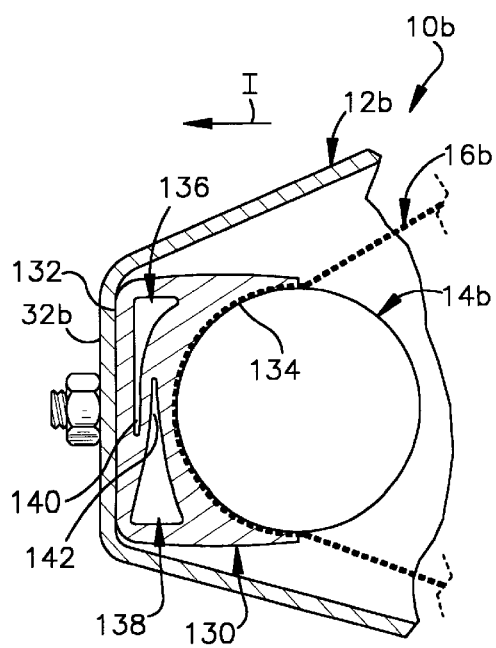
Fig.6    Fig.7

AIR BAG MODULE

BACKGROUND OF THE INVENTION

1. Technical Field

The present invention relates to a vehicle safety apparatus and, in particular, relates to an air bag module including an inflatable vehicle occupant protection device, such as an air bag, for helping to protect a vehicle occupant.

2. Description of the Prior Art

It is known to inflate an air bag to help protect a vehicle occupant in the event of an impact to a vehicle of a magnitude above a predetermined threshold. The air bag is stored in a deflated condition, together with an inflator, in a portion of the vehicle such as the instrument panel or steering wheel of the vehicle. In the event of an impact to the vehicle of a magnitude above a predetermined threshold, the inflator is actuated, and the air bag is inflated into a position adjacent to the vehicle occupant. The air bag helps protect the vehicle occupant from forcefully striking the instrument panel or steering wheel of the vehicle.

The inflator and the air bag are commonly housed in a container fixed to the instrument panel or steering wheel of the vehicle. When the inflator is actuated, a large amount of force can be rapidly transmitted into the container. Any excess force should be dissipated in a manner so as to avoid damage to the container or to the instrument panel or steering wheel of the vehicle or injury to the vehicle occupant.

SUMMARY OF THE INVENTION

The present invention is an apparatus for helping to protect an occupant of a vehicle. The apparatus comprises an inflatable vehicle occupant protection device for, when inflated, helping to protect the occupant of the vehicle. The apparatus also comprises an inflator for, upon actuation, providing inflation fluid to inflate the inflatable device. The apparatus further comprises means for supporting the inflator on a vehicle portion for movement in a first direction relative to the vehicle portion in response to actuation of the inflator. The apparatus comprises damping means connected between the inflator and the vehicle portion for damping movement of the inflator in the first direction relative to the vehicle portion. The damping means comprises a member having an opening. The member is crushable in response to movement of the inflator in the first direction to close the opening in the member.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 1 is a plan view, partially in section, of an air bag module constructed in accordance with the present invention, including an energy absorbing member in an uncrushed condition;

FIG. 2 is an enlarged view of a portion of FIG. 1;

FIG. 3 is a view similar to FIG. 2 showing the energy absorbing member in a crushed condition;

FIG. 4 is a side view similar to FIG. 1 of an air bag module constructed in accordance with a second embodiment of the present invention, including an energy absorbing member shown in an uncrushed condition;

FIG. 5 is a view similar to FIG. 4 showing the energy absorbing member in a crushed condition;

FIG. 6 is a side view similar to FIG. 4 of an air bag module constructed in accordance with a third embodiment of the present invention, including an energy absorbing member shown in an uncrushed condition;

FIG. 7 is a view similar to FIG. 6 showing the energy absorbing member in a crushed condition;

DESCRIPTION OF PREFERRED EMBODIMENTS OF THE INVENTION

Figure 8:
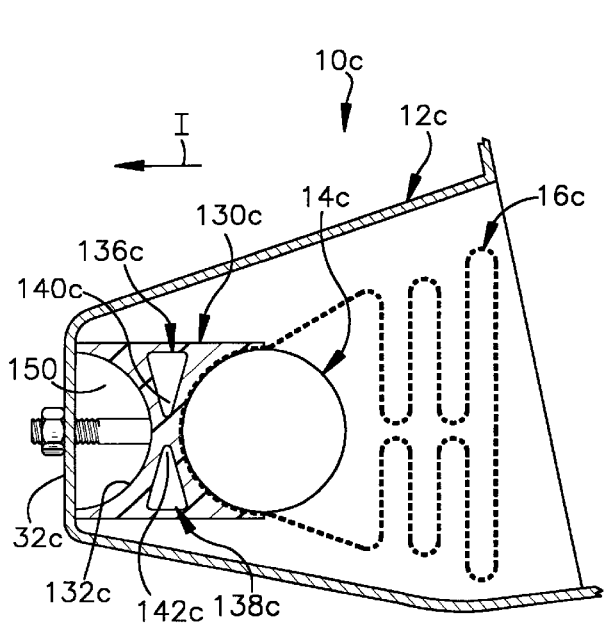
FIG. 8 is a side view similar to FIG. 4 of an air bag module constructed in accordance with a fourth embodiment of the present invention, including an energy absorbing member shown in an uncrushed condition.

The present invention relates to a vehicle safety apparatus and, in particular, relates to a module including an inflatable vehicle occupant protection device for helping to protect a vehicle occupant. The present invention is applicable to various vehicle safety apparatus constructions. As representative of the present invention, FIGS. 1–4 illustrate a vehicle safety apparatus or module 10 including an air bag 16. Other inflatable vehicle occupant protection devices that can be used in accordance with the invention include, for example, inflatable seat belts, inflatable knee bolsters, inflatable head liners or side curtains, and knee bolsters operated by inflatable air bags.

The air bag module 10 includes, in addition to the air bag 16, a reaction canister or container 12 and an inflator 14. The container 12 preferably comprises a portion of a vehicle such as the vehicle instrument panel. The container 12 could, alternatively, be a separate member secured to a portion of the vehicle, such as the instrument panel, steering wheel, seat, or door.

The container 12 (FIG. 1) is made from sheet metal and defines a chamber 30 in the container. The container 12 includes a back wall 32 which extends between and interconnects first and second side walls 34 and 36. The side walls 34 and 36 may be parts of a single wall which extends around the chamber 30. An outer edge portion of the container 12 defines a deployment opening 40 in the container opposite the back wall 32.

The inflator 14 can be a pyrotechnic inflator which uses the combustion of gas-generating material to generate inflation fluid in the form of gas to inflate the air bag 16. The inflator 14 alternatively can contain a stored quantity of pressurized inflation fluid, or a combination of pressurized inflation fluid and ignitable material for heating the inflation fluid.

The inflator 14 is held by a pair of mounting bolts 42 or other means to the back wall 32 of the container 12. Nuts 44 screwed on the mounting bolts 42 engage the back wall 32 of the container and prevent movement of the inflator 14 in an outward direction "O", that is, toward the deployment opening 40.

The inflator 14 has one or more fluid outlets 46 disposed inside the container 12 for directing inflation fluid into the chamber 30 upon actuation of the inflator. The inflator 14 is oriented in the container 12 so that the fluid outlets 46 are presented generally toward the deployment opening 40 in the container and away from the back wall 32 of the container.

The air bag 16 has a throat portion 48 which wraps around the inflator 14 and is secured by the mounting bolts 42 between the inflator and the back wall 32 of the container 12. The air bag 16 is preferably made from a fabric material such as woven nylon. The air bag 16 can alternatively be made from non-woven material, such as plastic film. The use of plastic film, in particular, would require inflation fluid vents to be formed in the air bag 16, as is known in the art.

The module 10 includes a damping mechanism or control mechanism 50 for controlling movement of the inflator 14, relative to the container 12, in an inward direction "I" opposite the outward direction "O". The damping mechanism 50 in the embodiment illustrated in FIGS. 1–4 includes a corrugated metal body 52 which is preferably made from steel. The corrugated metal body 52 is disposed between the inflator 14 and the back wall 32 of the container 12.

The corrugated metal body 52 includes four ribs 54, 56, 58 and 60 which are spaced apart along the length of the corrugated metal body. Each one of the four ribs 54–60 includes two side walls and a front wall as described below. In the illustrated embodiment, the two side walls of each one of the ribs 54–60 are not parallel to each other, although it is contemplated that they could be parallel to each other.

Specifically, the rib 54 (FIG. 2) includes two side walls 62 and 64 and a front wall 66. The front wall 66 of the rib 54 extends along the inflator 14 and the throat portion 48 of the air bag 16, in a direction parallel to the back wall 32 of the container 12 and generally perpendicular to the inward direction "I". The side walls 62 and 64 of the rib 54 extend at an angle of about 30 degrees to the inward direction "I". The three walls 62–66 of the rib 54 define a cavity 68 in the rib.

The three other ribs 56–60 are identical in configuration to the rib 54. The rib 56 includes a front wall 76 which extends along the inflator 14 and the throat portion 48 of the air bag 16, in a direction parallel to the back wall 32 of the container 12 and generally perpendicular to the inward direction "I". The rib 56 includes two side walls 72 and 74 which extend at an angle of about 30 degrees to the inward direction "I". The three walls 72–76 of the rib 56 define a cavity 78 in the rib.

The rib 58 includes two side walls 82 and 84 and a front wall 86. The front wall 86 of the rib 58 extends along the inflator 14 and the throat portion 48 of the air bag 16, in a direction parallel to the back wall 32 of the container 30 and generally perpendicular to the inward direction "I". The side walls 82 and 84 of the ribs 58 extend at an angle of about 30 degrees to the inward direction "I". The three walls 82–86 of the rib 58 define a cavity 88 in the rib.

The rib 60 includes a front wall 96 which extends along the inflator 14 and the throat portion 48 of the air bag 16, in a direction parallel to the back wall 32 of the container 12 and generally perpendicular to the inward direction "I". The rib 60 includes two side walls 92 and 94 which extend at an angle of about 30 degrees to the inward direction "I". The three walls 92–96 of the rib 60 define a cavity 98 in the rib. The cavities 68, 78, 88 and 98 in the ribs 54–60 together constitute an opening 100 in the corrugated metal body 52. The opening 100 is disposed between the inflator 14 and the back wall 32 of the container 12.

The four ribs 54–60 are interconnected by a series of three back wall segments 104, 106 and 108. The back wall segments 104–108 overlie the back wall 32 of the container 12. The back wall segments 104–108 are parallel to and spaced apart from the front walls 66, 76, 86 and 96 of the ribs 54–60.

The two mounting bolts 42 extend through the ribs 54 and 60 and thus through the cavities 68 and 98. The length of the mounting bolts 42 and the depth of the corrugated metal body 52 (as measured in the inward direction "I") are selected so that the corrugated metal body is securely clamped between the inflator 14 and the back wall 32 of the container 12. Thus, under normal usage conditions, the corrugated metal body 52 prevents movement of the inflator 14 in the inward direction "I" relative to the back wall 32 of the container 12.

In the event of an impact to the vehicle of a magnitude greater than the predetermined threshold value, the inflator 14 is actuated in a known manner and emits a large volume of inflation fluid under pressure. The inflation fluid is directed by the fluid outlets 46 of the inflator 14 into the chamber 30 in the container 12.

The inflation fluid from the inflator 14 flows primarily in the inflation direction or outward direction "O". This direction of flow of the inflation fluid is opposite to, or away from, the back wall 32 of the container 12. The outward flow of inflation fluid from the inflator 14 creates an equal and opposite reaction force on the inflator 14. The reaction force tends to urge the inflator 14 to move in the inward direction indicated by the arrow "I" in FIGS. 1–3.

The corrugated metal body 52 is constructed to enable relative movement to occur between the inflator 14 and the container 30, upon actuation of the inflator, in the inward direction "I". The characteristics of the corrugated metal body 52 are selected so that it deforms by a predetermined amount when subjected to a force having a magnitude which exceeds a predetermined amount. These characteristics include the material from which corrugated metal body 52 is made, the thickness of the material, and the configuration of the ribs 54–60. The predetermined force level is typically experienced only as a result of actuation of the inflator 14. In the preferred embodiment, the corrugated metal body 52 is constructed so that the inflator 14 moves about five millimeters in the inward direction "I" whenever the inflator is actuated.

The reaction force on the inflator 14 is transmitted through the body of the inflator into the corrugated metal body 52. The reaction force tends to urge the front walls 66, 76, 86 and 96 of the ribs 54–60 of the corrugated metal body 52 to move in the inward direction "I" relative to the back wall 32 of the container 12.

The force on the front walls 66, 76, 86 and 96 is transmitted into the side walls 62, 64, 72, 74, 82, 84, 92 and 94 of the ribs 54–60. The force on the side walls 62, 64, 72, 74, 82, 84, 92 and 94 quickly exceeds their resistance to deformation. The side walls 62, 64, 72, 74, 82, 84, 92 and 94 deform to enable a desired amount of relative movement to occur between the inflator 14 and the back wall 32 of the container 12. The corrugated metal body 52 crushes, and the inflator 14 moves inward relative to the back wall 32 of the container 12 from the position shown in FIGS. 1 and 2 to the position shown in FIG. 3. As the corrugated metal body 52 deforms, each one of the individual cavities 68, 78, 88 and 98 closes at least partially.

FIG. 3 illustrates the position of the parts of the module 10 at a time of about 20 milliseconds after actuation of the inflator 14. The inflator 14 has moved in the inward direction "I" to a substantially inward position relative to the container 12. The side walls of the ribs 54–60 are deformed by a substantial amount. As this deformation occurs, a large portion of the energy of the inwardly-moving inflator 14 is dissipated in the bending of the side walls 62, 64, 72, 74, 82, 84, 92 and 94 of the ribs 54–60. Specifically, the force which is required to deform the side walls of the ribs 54–60 of the corrugated metal body 52 is no longer present in the inflator 14 in the form of kinetic or potential energy. Preferably, the deformation of the rib side walls removes substantially all the kinetic energy of the inflator 14. The fluid outlets 46 of the inflator 14 remain in fluid communication with the air bag 16. Inflation fluid continues to flow from the outlets 46 into the air bag 14.

FIGS. 4 and 5 illustrate a vehicle safety apparatus 10a in accordance with a second embodiment of the present invention. The safety apparatus 10a is generally similar in construction to the safety apparatus 10 (FIGS. 1–3), and parts which are the same or similar are given the same reference numerals with the suffix "a" added for clarity. The safety apparatus 10a includes a crushable member or energy absorber 120 for controlling movement of an inflator 14a relative to a back wall 32a of a container 12a.

The crushable member 120 of the safety apparatus 10a includes a resilient body of material 122. The resilient body of material 122 is preferably made from molded urethane and has a generally rectangular cross-sectional configuration. A plurality of hollow spherical balls 124 are molded in the resilient body of material 122. The hollow spherical balls 124 are preferably made from a ceramic material and have diameters of about 0.050 inches. Each one of the hollow balls 124 defines a cavity or opening 126 which contains a quantity of gas, for example, air.

The crushable member 120 is disposed in the safety apparatus 10 between the inflator 14a and the back wall 32a of the container 12a. At least some of the plurality of balls 124 are disposed in the resilient body of material 122 in the path of movement of the inflator 14a in the inward direction "I".

When the inflator 14a is actuated, a reaction force tends to urge the inflator 14a to move in the inward direction "I". The reaction force is transmitted through the body of the inflator 14a into the crushable member 120. The resilient body of material 122 compresses, and force is transmitted into the hollow balls 124 which are in the path of movement of the inflator 14a. The hollow balls 124 crush. The crushing of the hollow balls closes the openings 126 in the hollow balls 124 and compresses the gas in the hollow balls thereby helping to resist movement of the inflator 14a in the inward direction "I".

FIGS. 6 and 7 illustrate a vehicle safety apparatus 10b in accordance with a third embodiment of the present invention. The safety apparatus 10b is generally similar in construction to the safety apparatus 10 (FIGS. 1–3), and parts which are the same or similar are given the same reference numerals with the suffix "b" added for clarity. The safety apparatus 10b includes a crushable member or energy absorber 130 for controlling movement of an inflator 14b relative to a back wall 32b of a container 12b.

The crushable member 130 is preferably made from molded urethane and is disposed in the safety apparatus 10b between the inflator 14b and the back wall 32b of the container 12b. The crushable member 130 has a planar back side surface 132 which is in abutting engagement with the back wall 32b of the container 12b. The crushable member 130 has a cylindrical front side surface 134 which is in abutting engagement with the inflator 14b.

A plurality of openings 136 and 138 are formed by molding in the crushable member between the front side surface 134 and the back side surface 132. The openings 136 and 138 are disposed in the path of movement of the inflator 14b in the inward direction "I". The openings have inner end portions 140 and 142, respectively, which overlap each other.

When the inflator 14b is actuated, a reaction force tends to urge the inflator 14b to move in the inward direction "I", that is, toward the back wall 32b of the container 12b. The reaction force is transmitted through the body of the inflator 14b into the crushable member 130. The crushable member 130 compresses, thereby resisting movement of the inflator 14b in the inward direction "I". The openings 136 and 138 which are in the path of movement of the inflator 14b, especially the inner end portions 140 and 142 of the openings, close as this movement occurs.

Figure 9:
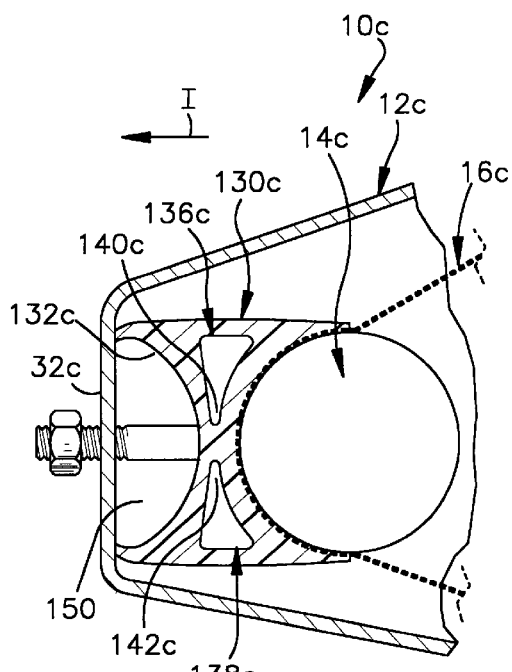
FIG. 9 is a view similar to FIG. 8 showing the energy absorbing member in a crushed condition.

FIGS. 8 and 9 illustrate a vehicle safety apparatus 10c in accordance with a fourth embodiment of the present invention. The safety apparatus 10c is generally similar in construction to the safety apparatus 10b (FIGS. 6–7), and parts which are the same or similar are given the same reference numerals with the suffix "c" added for clarity. The safety apparatus 10c includes a crushable member or energy absorber 130c for controlling movement of an inflator 14c relative to a back wall 32c of a container 12c.

The crushable member 130c of the safety apparatus 10c is substantially similar to the crushable member 130b of the safety apparatus 10b. The back side surface 132c of the crushable member 130c has a concave cylindrical configuration presented toward the back wall 32c of the container 12c. Thus, the crushable member 130c includes an additional opening 150 along the back wall 30c of the container 12c. The inflator 14c is spaced apart from the back wall 32c of the container 12c by a greater distance in the safety apparatus 10c than in the safety apparatus 10b. The additional opening 150 can provide extra crush distance in the event the force exerted on the crushable member 130c by the actuated inflator 14c is excessive.

Figure 10:
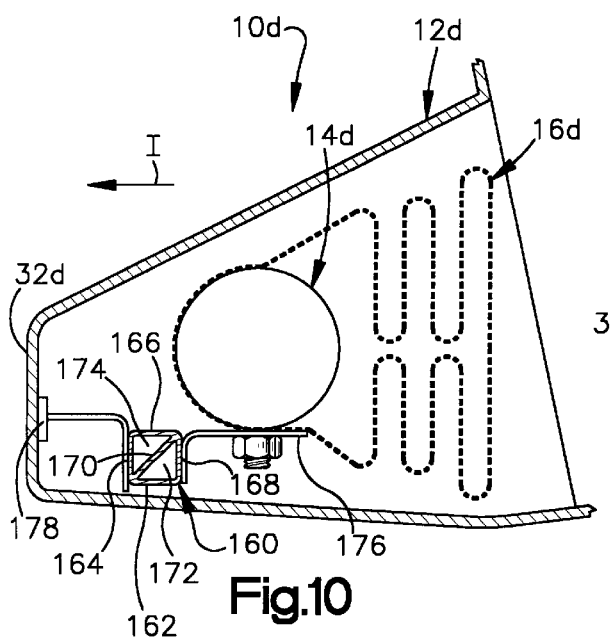
FIG. 10 is a side view similar to FIG. 4 of an air bag module constructed in accordance with a fifth embodiment of the present invention, including an energy absorbing member shown in an uncrushed condition.
Figure 11:
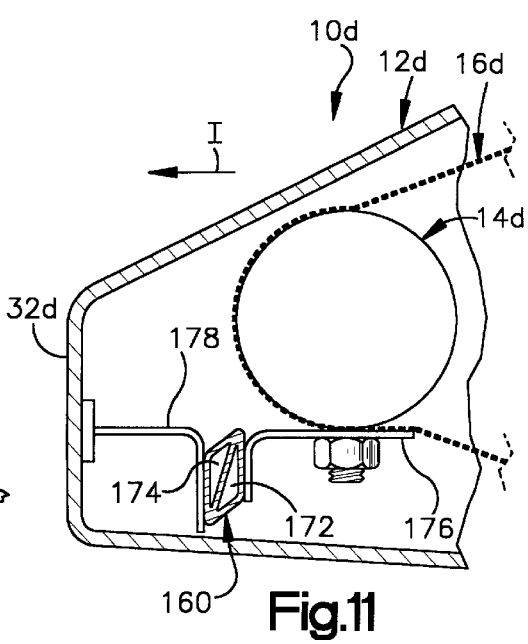
FIG. 11 is a view similar to FIG. 10 showing the energy absorbing member in a crushed condition.

FIGS. 10 and 11 illustrate a vehicle safety apparatus 10d in accordance with a fifth embodiment of the present invention. The safety apparatus 10d is generally similar in construction to the safety apparatus 10 (FIGS. 1–3), and parts which are the same or similar are given the same reference numerals with the suffix "d" added for clarity. The safety apparatus 10d includes a crushable member or energy absorber 160 for controlling movement of an inflator 14d relative to a back wall 32d of a container 12d.

The crushable member 160 of the safety apparatus 10d comprises a metal extrusion having a generally square cross-sectional configuration including four sides 162, 164, 166 and 168. An internal wall 170 of the crushable member 160 extends diagonally between opposite corners of the crushable member. Two parallel, triangular openings 172 and 174 are thus formed in the crushable member 160. Each one of the openings 172 and 174 has a triangular cross-sectional configuration. The crushable member 160 is disposed between a first mounting bracket 176 which supports the inflator 14d and a second mounting bracket 178 fixed to the container 12d.

When the inflator 14d is actuated, reaction force is transmitted through the first bracket 176 into the crushable member 160. The crushable member 160 compresses, thereby resisting movement of the inflator 14d in a direction toward the back wall 32d of the container 12d. The triangular openings 172 and 174, which are in the path of movement of the inflator 14d, close as the crushable member 160 is crushed during this movement.

From the above description of the invention, those skilled in the art will perceive improvements, changes and modifications in the invention. Such improvements, changes and modifications within the skill of the art are intended to be covered by the appended claims.

What is claimed is:

1. An apparatus for helping to protect an occupant of a vehicle, said apparatus comprising:

a container;

an inflatable vehicle occupant protection device for, when inflated, helping to protect the occupant of the vehicle;

an inflator for, upon actuation, providing inflation fluid to inflate said inflatable device;

said inflator having an inflation fluid outlet for directing inflation fluid to flow in an inflation direction into said inflatable device upon actuation of said inflator, the flow of inflation fluid in the inflation direction creating a reaction force on said inflator which moves said inflator in a first direction opposite the inflation direction;

means for supporting said inflator on said container for movement in the first direction relative to said container in response to actuation of said inflator; and damping means connected between said inflator and said container for damping movement of said inflator in the first direction relative to said container;

said damping means comprising a member having an opening, said member being crushable in response to movement of said inflator in the first direction to close said opening in said member.

2. An apparatus as set forth in claim 1 wherein said crushable member comprises a corrugated metal body having a plurality of ribs, said opening comprising a plurality of cavities defined by said ribs.

3. An apparatus as set forth in claim 2 wherein said each one of said ribs comprises a plurality of walls, at least some of said plurality of walls deforming to close at least partially said openings in response to movement of said inflator in the first direction.

4. An apparatus as set forth in claim 3 wherein said plurality of walls in each one of said ribs includes at least one wall which extends generally perpendicular to the first direction and at least two walls which extend at an angle to said at least one wall, said at least two walls collapsing in response to movement of said inflator in the first direction.

5. An apparatus as set forth in claim 2 wherein said corrugated metal body is made from steel.

* * * * *